United States Patent
Kelly et al.

(10) Patent No.: US 8,447,509 B2
(45) Date of Patent: May 21, 2013

(54) SYSTEM AND METHOD FOR TESTING CRASH AVOIDANCE TECHNOLOGIES

(75) Inventors: Joseph Kelly, Lakewood, CA (US); Peter Broen, Torrance, CA (US); Jordan Silberling, Redondo Beach, CA (US); Nenad Bozin, San Pedro, CA (US); John Zellner, Rancho Palos Verdes, CA (US)

(73) Assignee: Dynamic Research, Inc., Torrance, CA (US)

( * ) Notice: Subject to any disclaimer, the term of this patent is extended or adjusted under 35 U.S.C. 154(b) by 0 days.

(21) Appl. No.: 13/357,526

(22) Filed: Jan. 24, 2012

(65) Prior Publication Data

US 2013/0018526 A1 Jan. 17, 2013

Related U.S. Application Data

(60) Provisional application No. 61/507,539, filed on Jul. 13, 2011, provisional application No. 61/578,452, filed on Dec. 21, 2011.

(51) Int. Cl.
*G06F 17/10* (2006.01)
*G06G 7/78* (2006.01)
*G08G 1/16* (2006.01)

(52) U.S. Cl.
USPC .............................. 701/301; 701/2

(58) Field of Classification Search
USPC ............... 701/1, 2, 23, 28, 36, 117, 300, 301; 701/411, 420, 423; 73/12.04; 14/69.5; 104/37, 104/44, 45; 180/117, 271; 248/349.1, 678; 280/79.11, 504, 124.12, 164.1, 6.157, 656; 404/6, 10, 14, 15, 16, 71, 84.05, 169; 340/907, 340/988; 414/430, 229, 522, 537; 177/133, 177/209; 410/23, 66
See application file for complete search history.

(56) References Cited

U.S. PATENT DOCUMENTS

| 4,530,056 A | 7/1985 | MacKinnon et al. |
| 4,697,294 A * | 10/1987 | Schafer .......................... 14/69.5 |

(Continued)

FOREIGN PATENT DOCUMENTS

DE 102006010468 A1 * 9/2007

OTHER PUBLICATIONS

Zellner et al., "Extension of the Honda-DRI "Safety Impact Methodology" (SIM) for the NHTSA Advanced Crash Avoidance Technology (ACAT) Program and Application to a Prototype Advanced Collision Mitigation Braking System," SAE International, Paper No. 2009-01-0781; pp. 1-21, Apr. 20, 2009.

(Continued)

*Primary Examiner* — Thomas Black
*Assistant Examiner* — Isaac Smith
(74) *Attorney, Agent, or Firm* — Manuel de la Cerra

(57) ABSTRACT

A Guided Soft Target (GST) system and method provides a versatile test system and methodology for the evaluation of various crash avoidance technologies. This system and method can be used to replicate the pre-crash motions of the CP in a wide variety of crash scenarios while minimizing physical risk, all while consistently providing a sensor signature substantially identical to that of the item being simulated. The GST system in various example embodiments may comprise a soft target vehicle or pedestrian form removably attached to a programmable, autonomously guided, self-propelled Dynamic Motion Element (DME), which may be operated in connection with a wireless computer network. Specific geometries for the DME have been discovered that minimize the risk of the DME flipping up and hitting or otherwise damaging or disrupting the ride of typical test vehicles during impact of the test vehicles with the GST, all while minimizing the effect of the DME on the sensor signature of the GST.

18 Claims, 8 Drawing Sheets

U.S. PATENT DOCUMENTS

| | | | |
|---|---|---|---|
| 5,338,206 | A | 8/1994 | Hupfer |
| 5,550,742 | A | 8/1996 | Furuya et al. |
| 5,684,696 | A | 11/1997 | Rao et al. |
| 6,114,985 | A | 9/2000 | Russsell et al. |
| 6,729,826 | B2 * | 5/2004 | Brehmer et al. .......... 414/430 |
| 7,033,119 | B2 * | 4/2006 | Baker et al. .......... 410/66 |
| 7,103,704 | B2 | 9/2006 | Chatterjee |
| 7,575,491 | B1 | 8/2009 | Martin |
| 7,617,048 | B2 | 11/2009 | Simon et al. |
| 2005/0155441 | A1 | 7/2005 | Nagata |
| 2010/0087984 | A1 | 4/2010 | Joseph |
| 2010/0109835 | A1 | 5/2010 | Alrabady et al. |
| 2010/0274413 | A1 * | 10/2010 | Segall .......... 701/2 |
| 2011/0270467 | A1 | 11/2011 | Steffan et al. |

OTHER PUBLICATIONS

Zellner et al., "Extension of the Honda-DRI "Safety Impact Methodology" (SIM) for the NHTSA Advanced Crash Avoidance Technology (ACAT) II Program and Application to the Evaluation of a Pre-Production Head-On Crash Avoidance Assist System—Progress Report", SAE International, Paper No. 2012-01-0291, pp. 1-20, Apr. 16, 2012.

Kelly et al., "Development of a Guided Soft Target for Crash Avoidance Technology Evaluation", SAE International, Paper No. 2011-01-0580, pp. 1-9, Apr. 12, 2011.

\* cited by examiner

Light passenger vehicle Guided Soft Target

Light passenger vehicle Guided Soft Target

Light passenger vehicle Guided Soft Target during impact by Subject Vehicle

Light passenger vehicle Guided Soft Target before being impacted by Subject Vehicle Pedestrian Guided Soft Target

Example GST System Architecture

SYSTEM AND METHOD FOR TESTING CRASH AVOIDANCE TECHNOLOGIES

TECHNICAL FIELD

The present invention relates to systems and methods, including guided soft targets, for testing crash avoidance technologies.

BACKGROUND

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. Evaluating such ACAT systems presents many challenges. For example, the evaluation system should be able to deliver a potential Collision Partner (CP) reliably and precisely along a trajectory that would ultimately result in a crash in a variety of configurations, such as rear-ends, head-ons, crossing paths, and sideswipes. Additionally, the collision partner should not pose a substantial physical risk to the test driver, other test personnel, equipment, or to test vehicles in the event that the collision is not avoided. This challenge has been difficult to address. Third, the Collision Partner (CP) should appear to the test vehicle as the actual item being simulated, such as a motor vehicle, a pedestrian, or other object. For example, the CP should provide a consistent radar reflection signature to the various test vehicles, substantially identical to that of the item being simulated. While radar is a common sensor used in ACAT systems, several other sensors may be used in ACATs including lasers, sonar, and infra-red and visual image cameras. The point is that the CP should appear to the test vehicle sensor as the actual vehicle, person or object being simulated.

SUMMARY

A Guided Soft Target (GST) system and method are provided that overcome these challenges and more by providing a versatile test system and methodology for the evaluation of various crash avoidance technologies. This system and method can be used to replicate the pre-crash motions of the CP in a wide variety of crash scenarios while minimizing physical risk, all while consistently providing a sensor signature substantially identical to that of the item being simulated. The GST system in various example embodiments may comprise a soft target vehicle or pedestrian form removably attached to a programmable, autonomously guided, self-propelled Dynamic Motion Element (DME), which may be operated in connection with a wireless computer network. The Soft Car or Soft Pedestrian is intended to be a realistic representation of a CP for both the driver and the system under evaluation, and the DME serves as a means of conveyance for the Soft Car such that the motions of the CP are realistic. As a fully autonomous vehicle, the GST can operate in several modes. It can be programmed to coordinate its motions with the subject vehicle during the pre-crash phase such that the initial conditions of the crash phase are replicated from run to run. It can also be programmed to follow a predetermined trajectory in which position and speed are specified as functions of time to a target ground-fixed impact point; or operate in a mixed mode where the GST coordinates its motions with the subject vehicle during the initial phase of the event, and switches to a predetermined trajectory in which position and speed are specified as functions of time at the instant that the ACAT or subject vehicle driver begins to respond to the conflict. This enables the analyst to determine the effect of the ACAT system on the subject vehicle's potential impact with, or avoidance of, the GST as it arrives at the target impact point (e.g., the change in such indices as the "resultant relative velocity at minimum distance" (RRVMD), minimum distance (MD), etc.). Additionally, specific geometries for the DME have been discovered that minimize the risk of the DME flipping up and hitting or otherwise damaging or disrupting the ride of typical test vehicles during impact of the test vehicles with the GST, all while minimizing the DME's visibility to the test vehicle's sensor(s), and thereby minimizing the effect of the DME on the sensor signature of the GST.

The developed car and pedestrian GST system has versatile as well as robust capabilities, and provides test engineers with the flexibility and low test cycle time necessary for development and testing of ACATs. The GST system can replicate virtually any type of collision between the GST and the subject vehicle, including rear-ends, head-ons, crossing paths, sideswipes and pedestrian collisions. The Soft Car or Soft Pedestrian bodies can be constructed with a wide variety of three-dimensional shapes and sizes, allowing the ACAT developer or evaluator to measure the effect of the system across a range of collision partners. These collision partner soft bodies can be re-used and reassembled quickly (usually within 10 minutes), and the self-propelled-and-guided Dynamic Motion Element (DME), encased in a hardened, low-profile, drive-over shell, can be quickly repositioned, allowing the test team to evaluate large numbers of different, realistic scenarios with multiple repeats.

The development of a test methodology, based on the GST system, allows for the evaluation of diverse ACATs covering a wide range of crash and pre-crash conflict scenarios, effectively exercising the various modes and operating conditions of the ACAT. The ability to guide and propel a conflict partner on complex trajectories through the time of collision enables the evaluation of not only collision avoidance but also collision mitigation technologies. Further, the data collected for both the subject vehicle and GST in the course of such evaluations allows detailed analysis of system response and effectiveness, including its effects on collision avoidance (i.e., minimum distance) as well as its effects on collision severity (i.e., closing speed, contact points, relative heading angle) when a collision occurs.

The inventors are unaware of any prior methods or test systems in which the collision partner moves autonomously, with precise control, realistically, at relatively high speeds up to and through the point of impact, and can collide with a subject vehicle at relatively high collision speeds, while minimizing physical risk to test personnel, the subject vehicle, the collision partner, and other equipment. Further, the specific geometries for the DME that have been found to increase operational safety while minimizing sensor signature are believed to be new and nonobvious. Other aspects of the invention are disclosed herein as discussed in the following Drawings and Detailed Description.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing the invention.

DETAILED DESCRIPTION

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

DEFINITIONS

The following acronyms will be used throughout this description: Advanced Crash

Avoidance Technologies (ACATs); Guided Soft Target (GST); Dynamic Motion Element (DME); Forward Collision Warning (FCW); Crash Imminent Braking Systems (CIBS); Collision Partner (CP); Resultant Relative Velocity at Minimum Distance (RRVMD); Minimum Distance (MD); Wireless Local Area Network (WLAN); Guidance, Navigation and Control (GNC) computations; Differential GPS (DGPS); Ground Clearance (GC).

Dynamic Motion Element

The Dynamic Motion Element (DME) 100, examples of which are shown in FIGS. 1-5, is at the heart of the GST system. The DME 100 is a completely self-contained, un-tethered, relatively high-speed, mobile platform for the soft car 600, which performs all Guidance, Navigation and Control (GNC) computations, and is capable of being driven over by the subject vehicle 650 without damage to itself or the subject vehicle 650.

Positional measurements, which are the primary measurement used in typical GNC computations, are achieved via the on-board DGPS receiver. Other inputs to the GNC computations may include the yaw rate, as measured by a yaw rate sensor or inertial measurement unit, and heading angle, as measured by an electronic compass.

The DME 100 may incorporate a pair of brushless DC motors to drive, for instance, the rear wheel(s) 220, while steering of the front wheel(s) 200 may be accomplished via a brushless DC position control servo, for example. Wheels 200, 220 means the wheel assembly, including the tire or other material that contacts the ground. Front and/or rear brakes, such as disc brakes, may provide braking capability during a conflict scenario or to bring the DME 100 to a stop after a scenario. The brakes may be actuated autonomously by the DME 100 according to a pre-programmed trajectory or by a test engineer via a radio transmitter in order to perform an emergency-stop, for example.

Figure 1:
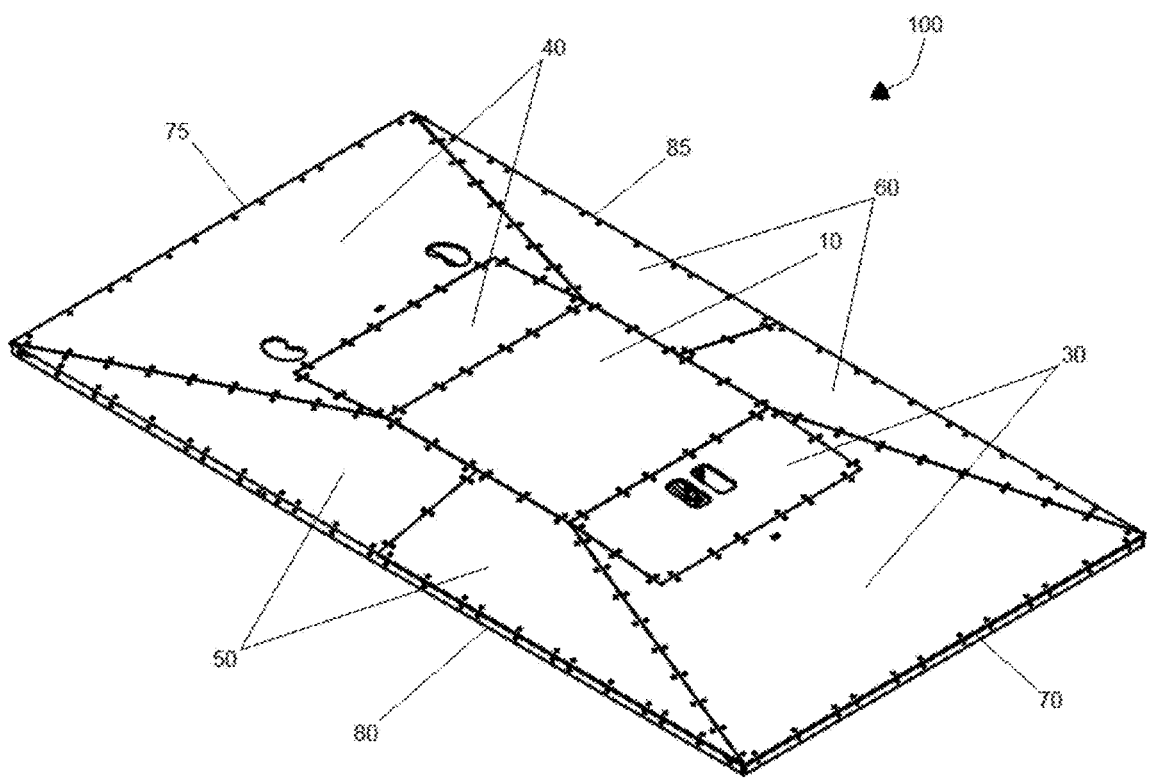
FIG. 1 is a top isometric view of an example Dynamic Motion Element (DME) according to various example embodiments.
Figure 2:
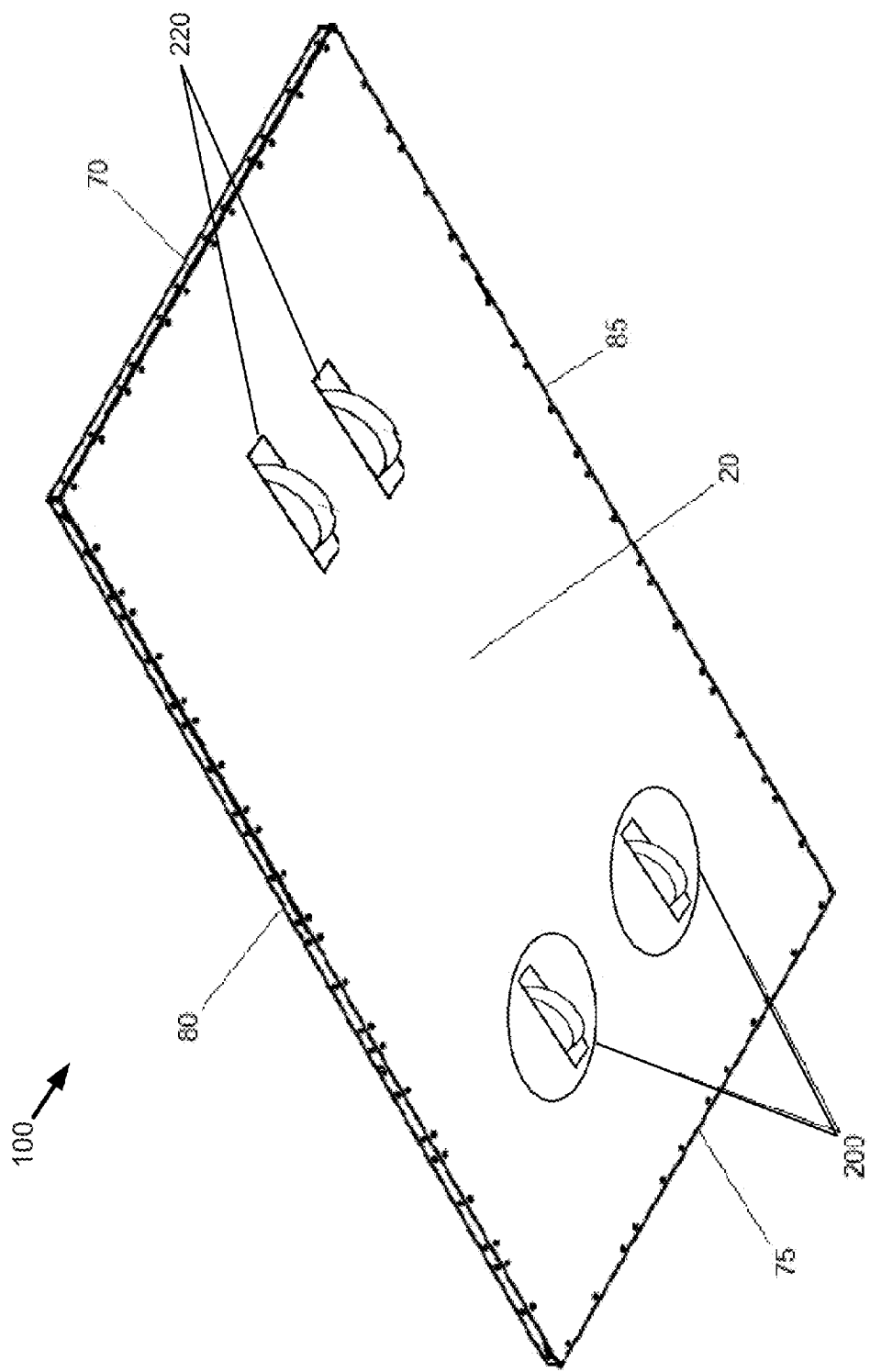
FIG. 2 is a bottom isometric view of the example Dynamic Motion Element (DME) of FIG. 1 according to various example embodiments.

The construction of the DME 100 facilitates mounting, housing and protection of all system components, including for example the computer, sensors, actuators, batteries, and power supplies. The DME 100 may be constructed primarily of aluminum, steel, or any suitably strong material(s), and may utilize an egg-crate, honeycomb, or similar type internal structure (not shown) with exterior armor cladding. With reference to FIG. 1, the DME 100 may include a front side 75, a rear or back side 70, a left side 80 (which would be a driver's side if the DME was an automobile in the U.S.), and a right side 85 (which would be a passenger's side if the DME was an automobile in the U.S.). The exterior armor cladding may comprise a top surface 10 and a bottom surface 20 (shown in FIG. 2), a front upper surface 40, a rear upper surface 30, a left side upper surface 50, and a right side upper surface 60. Other or fewer surfaces may be employed in various other embodiments. As shown in FIG. 2, wheels may extend downward below bottom surface 20. In one example embodiment, wheels may comprise one or more non-steered wheels 220 and one or more steered wheels 200. Any or all of the wheels may be steered, and any or all of the wheels may be driven. In one example embodiment discussed herein, the rear wheels 220 (which may comprise two wheels adjacent to each other) are driven and the front wheels 200 are steered, that is, at least partially rotatable about a substantially vertical axis (i.e., an axis substantially perpendicular to bottom surface 20).

Figure 3:
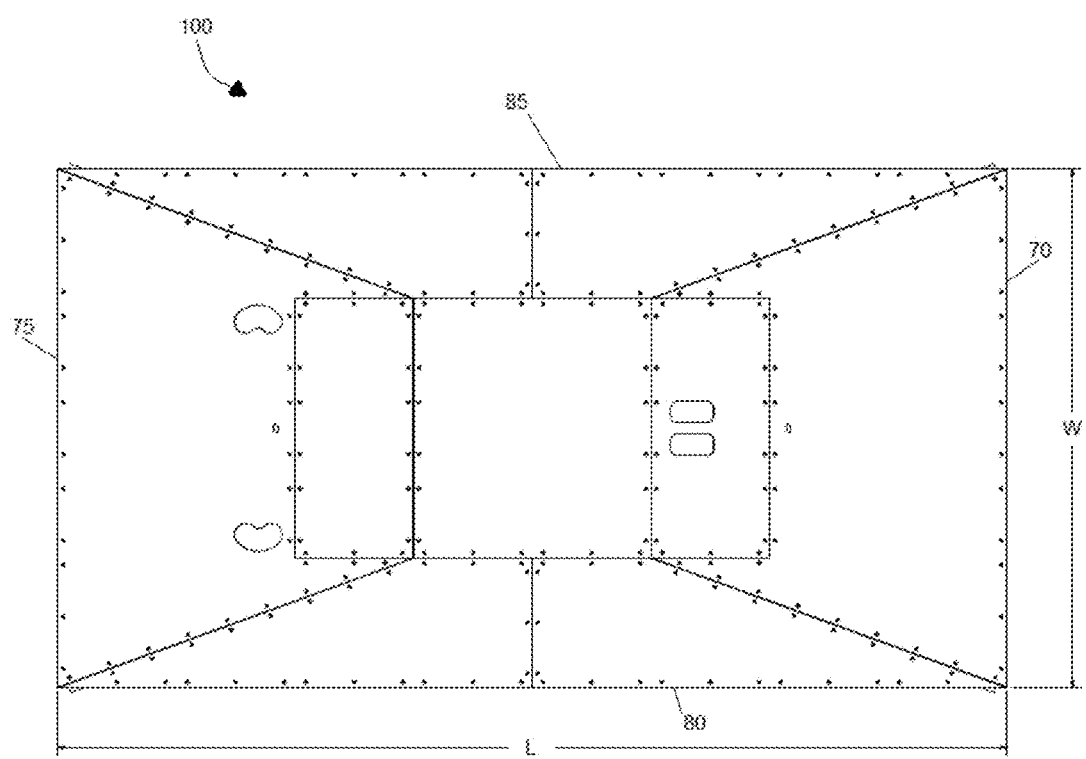
FIG. 3 is a top plan view of the example Dynamic Motion Element (DME) of FIG. 1 according to various example embodiments.
Figure 4:
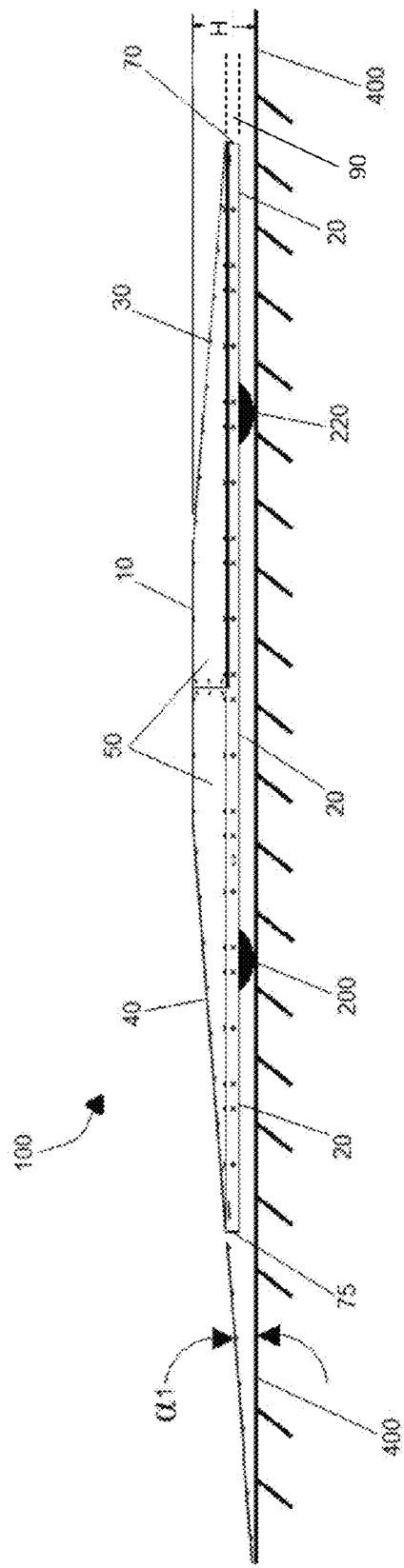
FIG. 4 is a left side elevation view of the example Dynamic Motion Element (DME) of FIG. 1 according to various example embodiments.
Figure 5:
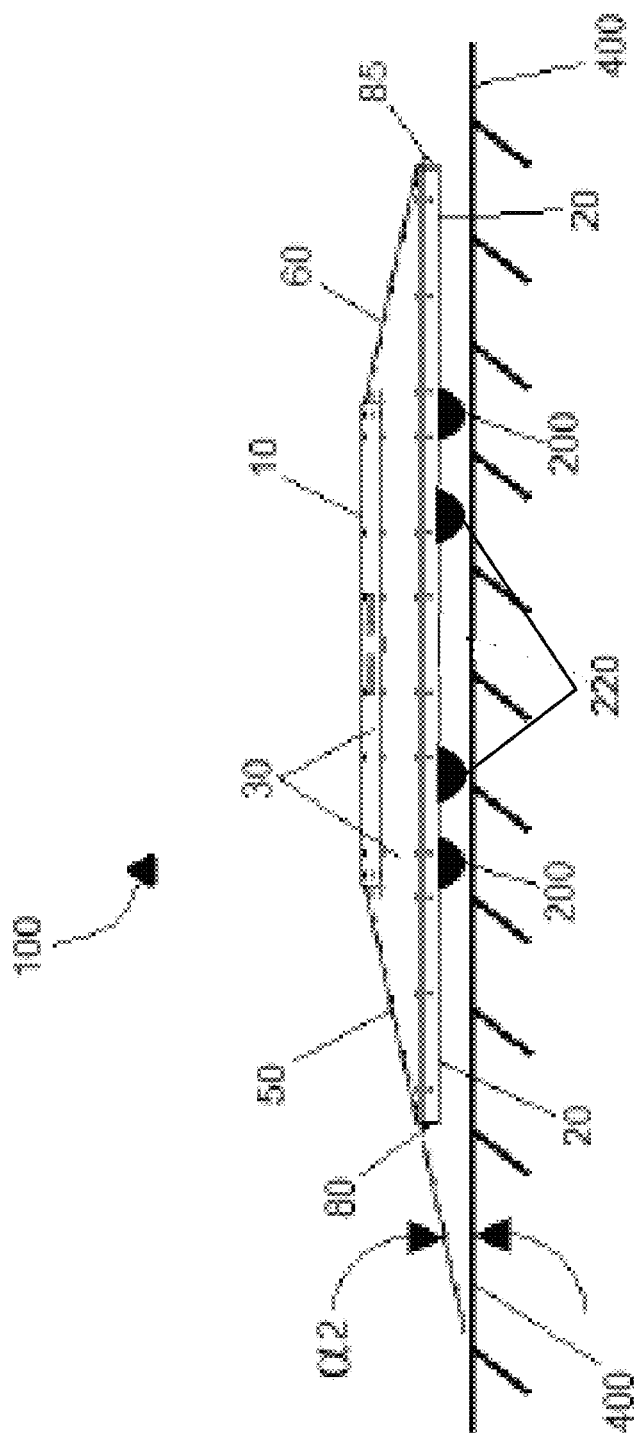
FIG. 5 is a back side elevation view of the example Dynamic Motion Element (DME) of FIG. 1 according to various example embodiments.
Figure 6B:
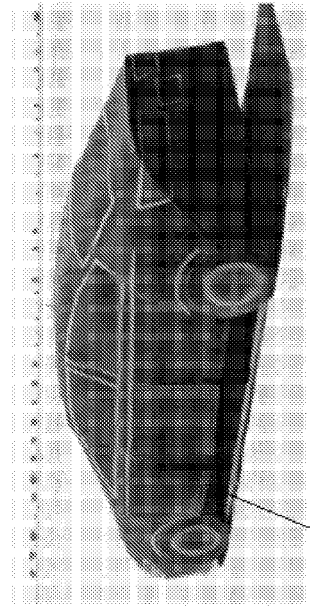
FIG. 6B is a back perspective view of the example light passenger vehicle Guided Soft Target (GST) of FIG. 6A according to various example embodiments.
Figure 6A:
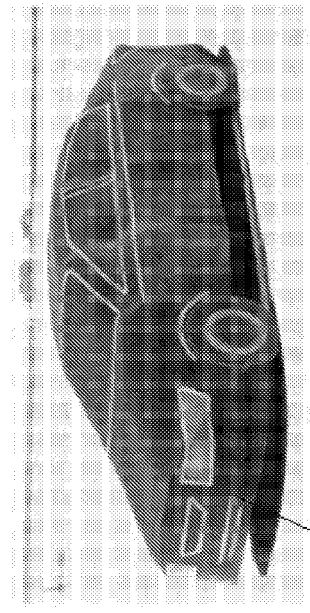
FIG. 6A is a front perspective view of an example light passenger vehicle Guided Soft Target (GST) according to various example embodiments.
Figure 6D:
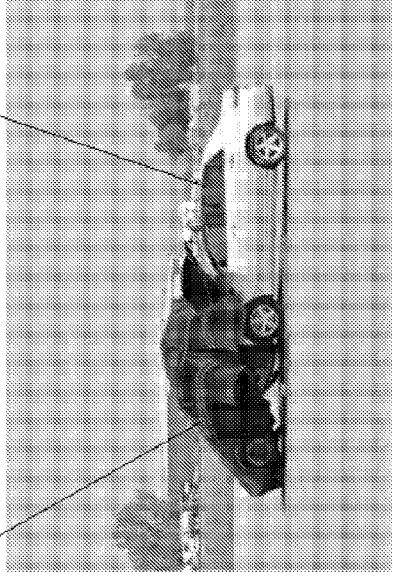
FIG. 6D is a side elevation view of the example light passenger vehicle Guided Soft Target (GST) of FIG. 6A, shown while being impacted by an example Subject Vehicle (SV), according to various example embodiments.
Figure 6C:
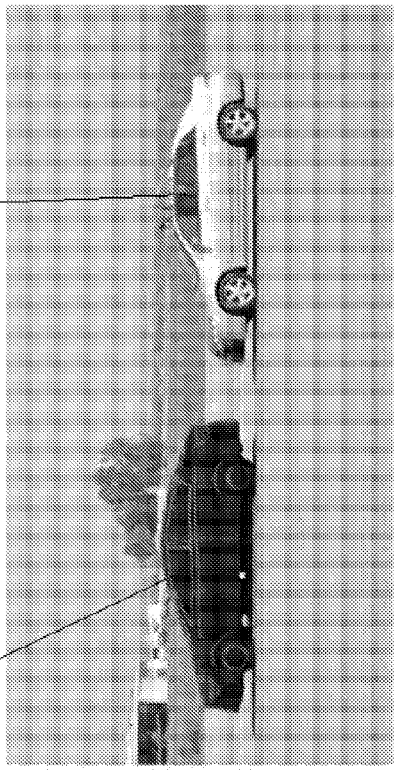
FIG. 6C is a side elevation view of the example light passenger vehicle Guided Soft Target (GST) of FIG. 6A, shown before being impacted by an example Subject Vehicle (SV), according to various example embodiments.

As illustrated in the example embodiments shown in FIGS. 3, 4 and 5, the large horizontal dimensions L, W, and small height H of DME 100 create shallow approach angles $\alpha 1$, $\alpha 2$, minimizing the load imparted horizontally when driven over by the subject vehicle 650, for instance as shown in FIG. 6D. These dimensions also minimize the potential for contact between the subject vehicle 650 structure (e.g., undercarriage or bumpers) and the DME 100 structure, for instance by the DME flipping up against the subject vehicle 650 when the GST is impacted by the subject vehicle 650.

With reference to FIG. 3, to avoid "flip up" of the DME 100 under the subject vehicle 650, dimension L may optimally be selected to be greater than or equal to the wheelbase of the typical subject vehicle 650 (i.e., the distance from the centerline of the front axle to the centerline of the rear axle of the subject vehicle 650). To minimize the effect of the DME 100 on the sensor signature of the GST, dimension L may be selected to be less than the overall length of the soft body 600. In a first embodiment, dimension L may be selected to be about 2000 millimeters, plus or minus 300 millimeters, for instance for use with smaller vehicles. In a second embodiment, dimension L may be selected to be about 2600 millimeters, plus or minus 300 millimeters, for instance for use with larger vehicles. In a third embodiment, dimension L may be selected to be about 3200 millimeters, plus or minus 300 millimeters, for instance for use with long vehicles. In a fourth embodiment, dimension L may be selected to be about 4000 millimeters, plus or minus 500 millimeters, for instance for use with very long wheel-base vehicles such as crew cab long bed pick-up trucks.

Also to avoid "flip up" of the DME 100 under the subject vehicle 650, dimension W may optimally be selected to be greater than or equal to the track width of the typical subject vehicle 650 (i.e., the distance from the centerline of the driver's side tires to the centerline of the passenger's side tires of the subject vehicle 650). To minimize the effect of the DME 100 on the sensor signature of the GST, dimension W may be selected to be less than the overall width of the soft body 600. In the first embodiment, dimension W may be selected to be about 1200 millimeters, plus or minus 300 millimeters, for instance for use with smaller vehicles. In the second embodiment, dimension W may be selected to be about 1800 millimeters, plus or minus 300 millimeters, for instance for use with larger vehicles. In the third and fourth embodiment, dimension W may be selected to be about 2600 millimeters, plus or minus 500 millimeters, for instance for use with very large vehicles such as heavy trucks.

Any other lengths for dimensions L and W may be used as long as they are coordinated with each other and dimension H to result in angles $\alpha 1$, $\alpha 2$, falling within appropriate ranges, discussed below. For example, in the example embodiments shown in FIGS. 6A-6D in which the subject vehicle 650 was a late model Honda Accord, dimension L was selected to be about 2790 millimeters, dimension W was selected to be about 1520 millimeters, and H was selected to be about 130 millimeters (plus or minus 10 millimeters). Dimensions L and W can be smaller than the first embodiment where the GST is a smaller object such as a pedestrian 700, such as in the example DME 100' shown in FIG. 7. Finally, dimensions L and W could be scaled up beyond those provided in the fourth embodiment to work with even larger subject vehicles 650.

With reference to FIGS. 4 and 5, H is the vertical dimension from the ground 400 (ground 400 meaning the surface of the road or other surface on which the DME 100 travels) to the top 10 of DME 100. To minimize the ride disturbance to the subject vehicle 650, H is preferably as small as possible. Minimizing H tends to prevent discomfort to drivers and potential accidents, and minimizes chances of damage to the subject vehicle 650 or instrumentation attached thereto, airbag deployment, and the like. H is also preferably minimized to prevent the chance of the DME 100 striking the bottom of the subject vehicle 650 even when the DME 100 does not "flip up." Minimizing H requires minimizing Ground Clearance (GC). The Ground Clearance or GC of the DME 100 is the vertical distance from the ground 400 to the bottom 20 of DME 100. Nominal Ground Clearances that have been found to work acceptably include distances of about 12 to 19 millimeters, and at least about 5 millimeters but preferably no more than 50 millimeters. This GC helps to avoid "flip up" of the DME 100 under the subject vehicle 650. In the embodiments described herein H has been minimized to about 130 millimeters, plus or minus 10 millimeters. Using other materials and smaller components could potentially reduce H even further. In addition to these dimensions, the edge thickness of the DME 100, shown at position 90, may be less than 30 millimeters, again to minimize the radar or other sensor signature of the DME 100.

H is minimized not only to minimize ride disturbance of the subject vehicle 650 and to prevent contact of the DME 100 to the undercarriage of the subject vehicle 650, but H is also selected to coordinate with dimensions L and W so that angles $\alpha 1$, $\alpha 2$, are minimized and fall within appropriate ranges. As shown in FIG. 4, angle $\alpha 1$ is the angle between the ground 400 and the upper back surface 30 of the DME 100, or between the ground 400 and the upper front surface 40 of the DME 100, or both. In typical embodiments angle $\alpha 1$ is the same for both the front and back upper surfaces, 30, 40, of DME 100, however, angle $\alpha 1$ can differ between the front and rear the upper surfaces, 30, 40, of the DME 100 if the upper surfaces of DME 100 are not symmetrical about a central latitudinally-extending vertical plane. As shown in FIG. 5, angle $\alpha 2$ is the angle between the ground 400 and the upper left side surface 50 of the DME 100, or between the ground 400 and the upper right side surface 60 of the DME 100, or both. In typical embodiments angle $\alpha 2$ is the same for both the left and right upper surfaces, 50, 60, of DME 100, however, angle $\alpha 2$ can differ between the left and right upper surfaces, 50, 60, of the DME 100 if the upper surfaces of DME 100 are not symmetrical about a central longitudinally-extending vertical plane. Importantly, while upper surfaces 30, 40, 50 and 60 are shown as substantially flat planes each comprising multiple panels, any or all of upper surfaces 30, 40, 50 and 60 may be curved and not flat, or partially curved and partially flat. Where any or all of upper surfaces 30, 40, 50 and 60 are curved and not flat, or are partially curved and partially flat, angles $\alpha 1$, $\alpha 2$, may be measured between the ground 400 and the steepest portion of any of corresponding upper surfaces 30, 40, 50 and 60. For purposes of this measurement the steepness or angle of a curve at a given point is measured by a line tangent to the curve at that point, i.e., the first derivative thereof, as is known in the art.

Like H, angles $\alpha 1$, $\alpha 2$, are minimized to minimize ride disturbance of the subject vehicle 650 and to make the subject vehicle 650 travel as smoothly as possible over the DME 100. In various embodiments $\alpha 1$ and $\alpha 2$ may each be selected to be less than about 45 degrees, and preferably less than 15 degrees. In one example embodiment $\alpha 1$ is selected to be about 5 degrees while $\alpha 2$ is selected to be about 13 degrees.

ACATs use various types of sensors to detect obstacles in the path of the subject vehicle 650, and to alert the driver or take evasive action or some other action if the ACAT determines that the subject vehicle is likely to collide with such an obstacle. Accordingly, these sensor systems have often been designed not to be triggered by items normally in the roadway, such as raised manhole covers and highway construction plates, or at least distinguish between such items close to the roadway and larger items, such as another vehicle. Still, some ACAT systems may trigger an alarm or some other type of response if they detect something in the roadway as large as a DME 100. For this reason, it has been discovered to be important to minimize the sensor signature of the DME 100. Additionally, to achieve accurate results when testing ACATs against GSTs that simulate objects such as vehicles, pedestrians, or other objects, it is helpful to minimize the distortion of the sensor signature of the simulated vehicle, pedestrian, or other object that is caused by the presence of the DME 100. For this separate reason it has been discovered to be important to minimize the sensor signature of the DME 100.

The geometries disclosed herein for DME 100 have been found to effectively minimize the sensor signature of the DME 100. While all of the geometries disclosed above are useful for minimizing the sensor signature of the DME 100, it has been discovered that the following characteristics are individually and together particularly helpful in minimizing the sensor signature of the DME 100: H less than about 350 millimeters, and preferably not more than about 300 millimeters; α1 and α2 not more than about 45 degrees, and L and W dimensions within the corresponding length and width dimensions of the soft car 600 (shown in FIGS. 6A-6D) or other item that is mounted to the DME 100 to create the GST. For example, for a typical soft car 600 the L and W dimensions may be not more than about 4880 millimeters for L and about 1830 millimeters for W. Other L and W dimensions may be appropriate for other GSTs, as will be apparent to persons of skill in the art upon reviewing this disclosure.

The DME 100 may also employ retractable running gear, such that the structure "squats" onto the road surface when driven over by the subject vehicle 650. This creates a direct load path from the tires of the subject vehicle 650 to the ground 400 without passing through the GST wheels 200, 220 and associated suspension components. This may be accomplished through the use of pneumatic actuators that create just enough force to deploy the wheels 200, 220 and lift the DME 100 to its maximum ground clearance, for instance approximately one centimeter. In these embodiments the DME structure 100 can squat passively under the loading of the tires of the subject vehicle 650, without requiring dynamic actuation.

Soft Car

Figure 7:
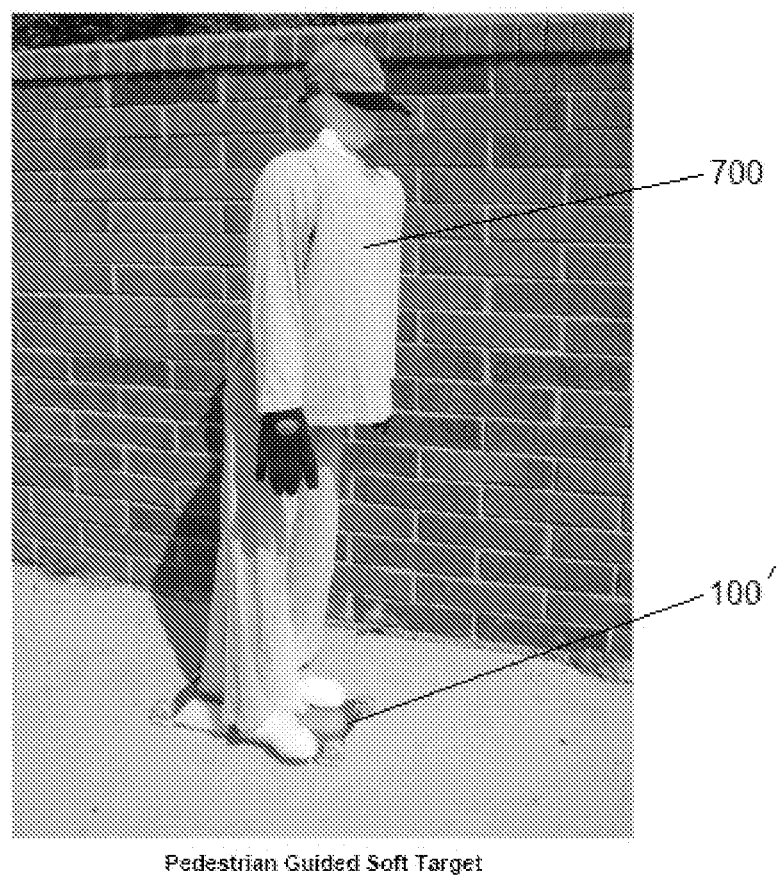
FIG. 7 is a front perspective view of an example pedestrian Guided Soft Target (GST) according to various example embodiments.

The soft car 600 as shown in FIGS. 6A through 6D is removably mounted atop the DME 100 and is designed to minimize the potential for damage to the body panels of the subject vehicle 650 that impacts the soft car body 600. The soft car body 600 can be designed to replicate the three-dimensional shape, appearance and size of various objects, such as light passenger vehicles. It may be constructed completely from "soft" materials, such as polyethylene foam, hook-and-loop closure and flexible epoxy, for instance. The panels of the soft car body 600 and internal structure may be fabricated completely from light-weight, flexible and durable polyethylene foam, and may be connected to each other and to the DME 100 top surface by way of hook-and-loop or similarly functioning material. This minimizes the risk of tearing individual panels, and also allows for quick reassembly after a collision with the subject vehicle 650. The internal structure of the soft car 600 may be made up of bulkheads that interconnect to form a framework for the outer skin panels. These bulkheads can provide enough structural support for the body panels under higher speed aerodynamic loading but are light and flexible relative to the subject vehicle 650, thereby minimizing the load imparted to the subject vehicle 650 body panels in the event of a collision. Instead of a soft car 600 as shown in FIGS. 6A through 6D, any other shape may be attached to the DME 100 to form a GST, such as an inflatable pedestrian shape 700, as shown in FIG. 7, or such as an inflatable vehicle shape.

Example System Architectures and Functions

Figure 8:
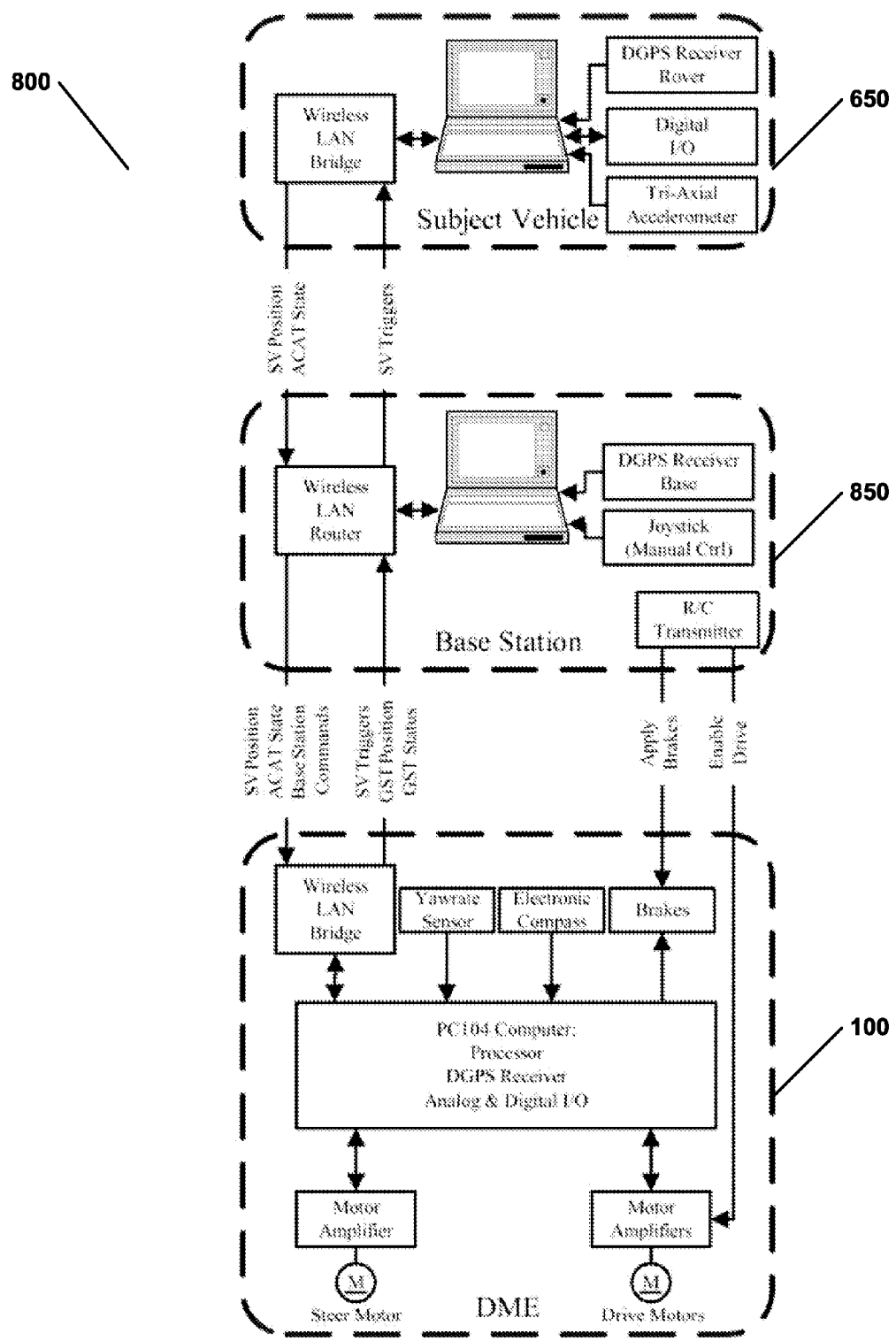
FIG. 8 is a diagram showing certain elements of an example Guided Soft Target (GST) system architecture according to various example embodiments.

GST systems in various example embodiments may comprise, for instance, a plurality of computers that communicate, for instance via a Wireless Local Area Network (WLAN), and perform various functions. FIG. 8 illustrates the overall architectural layout of an example GST system 800, which may include the following nodes and their associated peripheral equipment, for example: a subject vehicle 650; base station 850; and DME 100.

The computer associated with the subject vehicle 650 may perform the various data I/O functions within the subject vehicle 650, and provide the measured data to the rest of the system. Additionally, the subject computer may control discrete events within the subject vehicle 650. The subject vehicle 650 node may comprise the following components, for example: notebook computer; differential GPS receiver; tri-axial accelerometer; digital I/O board to monitor and control discrete events (e.g., sense ACAT warning on/off, illuminate LEDs, initiate open-loop braking, provide audible alerts); and wireless LAN bridge, for instance.

The base station 850 may act as the central hub for all communications and allow the operator to monitor and control the system. The base station 850 may comprise the following components, for example: Differential GPS (DGPS) base station receiver; notebook computer; joystick; wireless LAN router; and radio transmitter to provide emergency-stop capability, for instance.

The computer associated with the base station 850 may allow the system operator to run a complete suite of tests from a single location. From the computer associated with the base station 850, the operator may perform the following functions, for example: setup and configuration of subject vehicle 650 and GST computers via remote connection; monitor subject vehicle 650 and GST positions, speeds, system health information and other system information; setup of test configuration; test coordination; post-test data analysis; and selection of GST modes, including, for example: hold; manual; semi-autonomous; and fully autonomous, for instance. Additionally, the functions of the computer associated with the base station 850 may also be accomplished on the computer associated with the subject vehicle 650, reducing the number of computers in the computer network. In this embodiment of a GST, the base station, or operator's console would be located in the subject vehicle 650

The DGPS receiver in the base station 850 may provide corrections to the roving DGPS receivers in both the DME 100 and the subject vehicle 650 via a WLAN or other communications network. This may be accomplished without the need for a separate DGPS radio modem, minimizing the number of antennas on each node of the system. This may be important in the case of the DME 100, since all connections to antennas are typically made frangible, such that they can separate from the DME 100 in the event of a collision with the subject vehicle 650.

Example DME 100 subsystems may comprise the following components, among others, for instance: wireless LAN bridge; PC 104 computer; yaw rate sensor; electronic compass; two brushless DC drive motors and amplifiers; a brushless DC steering motor and amplifier; brake system; RF emergency brake system; DGPS receiver; a DME computer such as a PC 104 computer that performs functions such as the following example functions: Guidance, Navigation and Control (GNC) computations; analog and digital data input and output; inputs, including: differential GPS information; electronic compass (heading angle); yaw rate; drive motor speed; steering angle; drive motor amplifier temperature; drive motor winding temperature; and outputs, including: drive motor torque command; steer motor angle command; brake command; system health monitoring; and data collection, for instance. Other or fewer components may be used in various example embodiments.

Method of GST Operation

Prior to testing, paired time-space trajectories for the subject vehicle 650 and GST (e.g., a soft body 600, 700, mounted on a DME 100) may be generated. These trajectories should be physics-based, and either can be hypothetical or reconstructed real-world crash scenarios. Trajectories can be specified to result in any manner of collision between the subject vehicle 650 and GST, and can include variations in speed and path curvature for both the subject vehicle 650 and GST. The spatial trajectories may be stored in files which also include subject vehicle 650 and GST speeds along their respective paths, and scenario-specific discrete events. These discrete events (e.g., point of brake application) can be used to control the timing of events in the subject vehicle 650 at known points along the subject vehicle 650 path. These can be used to initiate open-loop braking, illuminate LEDs, or provide audible alerts within the subject vehicle 650, for example.

In various embodiments a GST system 800 may have, for instance, four different modes of operation: hold; manual; semi-autonomous; and fully-autonomous. The Hold Mode is the "idle" mode for the GST system. In this mode, the output signals to the steering and drive motors may be nullified, but the GUI for the base station 850 may continue to show data from the GST and subject vehicle 650 sensors. Whenever the GST is switched into this mode from one of the "active" modes (e.g., Manual, Semi-Autonomous or Fully Autonomous), data that was collected during the active mode may be transferred wirelessly to the computer associated with the base station 850 for further analysis.

The Manual Mode may be completely human-controlled via a joystick associated with the base station 850. In this mode, the operator may have remote control over the speed and steering of the GST. This mode may be useful in pre-positioning the GST or for returning it to base for charging the batteries, routine service, or for shutting down the system.

The Semi-Autonomous Mode allows the operator of the base station 850 to control the speed of the GST while the path following may be accomplished autonomously. This may be especially useful for pre-positioning the GST before a given test run, since the GST can be driven starting from any point on the test surface, and it will seek and converge on the desired path. The path-following GNC algorithm also may allow for operation in reverse, allowing the operator to drive the GST in reverse along the path for fast repetition of tests.

The Fully Autonomous Mode may require no further inputs from the base station 850. In this mode, the subject vehicle 650 may be driven along the subject vehicle 650 path, and the GST computes the speed and steering inputs necessary to move along its own path in coordination with the subject vehicle 650, as determined by the pre-programmed trajectory pair. In this way, the longitudinal position of the GST may be driven by the longitudinal position of the subject vehicle 650 such that the GST arrives at the pre-determined collision point at the same moment as the subject vehicle 650, even accommodating errors in the speed of the subject vehicle 650 (relative to the speed in the trajectory file) as it approaches by adjusting its own speed. As an option, the test engineer can enable a sub-mode in which, if the subject vehicle 650 driver or ACAT system begins to react to the impending collision, the GST speed command may be switched to the speed contained in the trajectory file such that it is no longer dependent upon the speed of the subject vehicle 650. The switch to this sub-mode may be made automatically (mid-run) when the subject vehicle 650 acceleration exceeds a predetermined threshold (e.g., 0.3 g) or when subject vehicle 650 ACAT system activation may be sensed via a discrete input. In this way, the GST passes through the would-be collision point at the speed prescribed in the trajectory file, irrespective of the position or speed of the subject vehicle 650.

Testing with the GST

During test setup, the paired time-space trajectories may be wirelessly loaded into the DME 100 on-board processor from the base station 850, and the GST may be placed into the fully autonomous mode. As the subject vehicle 650 begins to travel along its path, its position (as measured by differential GPS) may be transmitted wirelessly to the DME 100 processor, which may be programmed to accomplish lateral and longitudinal control to obtain the desired relative closed-loop trajectories. A given test run can culminate in a collision between the subject vehicle 650 and the GST, as shown in FIG. 6D, in which case, the GST may be brought to a stop using a radio transmitter, separate from the WLAN, which can actuate the onboard brakes of the GST, and disable the drive motors. Test data may be automatically transmitted wirelessly from the DME 100 to the computer associated with the base station 850 once the operator transitions from the Fully Autonomous mode to the Hold mode. The soft car 600 can then be reassembled on the DME 100, usually within 10 minutes with a crew of two, and the GST can then be repositioned for the next run.

The GST may employ high-performance and high-efficiency components, allowing it to reach relatively high speeds and achieve high positional accuracy along its trajectory, both laterally and longitudinally. Brushless DC drive motors efficiently deliver high power from a small package, and a Differential GPS receiver provides high positional accuracy. The GNC algorithm is able to utilize the capabilities of these sensors and actuators to maximize the utility of the test methodology.

Results

A complete listing of GST performance specifications of example embodiments disclosed herein is shown below in Table 1.

TABLE 1

Example GST Performance Specifications

| Specification | Value |
| --- | --- |
| DGPS positional accuracy | 1 cm (depending on DGPS receiver) |
| DME waypoint accuracy | Lateral: 300 mm Longitudinal: 300 mm |
| DME top speed (alone) | 80 km/h |
| DME + Soft Car speed | >55 km/h (demonstrated) |
| Maximum closing speed at impact | 110 km/h (demonstrated) |
| Longitudinal acceleration | ±0.3 g |
| Longitudinal deceleration under braking | −0.6 g |
| Lateral acceleration | ±0.3 g |
| Distance traveled per battery charge | 4 km at 40 km/h (theoretical) |
| Remote control range | 0.5 km |
| Drive motor performance | 2 brushless DC drive motors, totaling: 30 kW peak 6 kW continuous |
| Bus voltage | 200 VDC |
| Turning radius | <3 m |
| Visibility with Soft Car body, daylight | >0.5 km |
| Battery charge time | 30-40 min (for full charge of depleted batteries) |
| Soft Car reassembly time | 10 minutes |

The GST System 800 is a fully-functional and proven system for evaluating ACATs throughout the entire pre-conflict and conflict scenario up to the time of collision. By enabling the ACAT to be evaluated up to the time of collision, the GST System 800 allows the mitigation capabilities of ACATs to be evaluated in a way that cannot be achieved via testing that does not involve actual collisions. Additionally, the DME 100 allows the evaluation of ACATs in conflict scenarios where the CP is not static. The full-sized soft car 600 allows evaluations of the ACAT in any crash configuration without requiring specific soft targets 600 for each configuration (e.g., rear-end soft targets).

As one example, the GST System 800 was used in the evaluation of a prototype Advanced Collision Mitigation Braking System (A-CMBS). The A-CMBS system was designed to alert the driver in the event of a likely collision and to mitigate the collision severity through automatic application of the brakes for imminent collisions. The test matrix for this evaluation consisted of thirty-three unique crash scenarios, representing four different crash types, repeated with and without the ACAT active. The crash types involved were: Pedestrian; Rear end; Head-on; and Crossing path. During the course of testing, the GST was struck or run over by the subject vehicle 650 more than sixty-five times without being damaged or causing damage to the subject vehicle 650.

By repeating the same conflict scenario with and without the ACAT active, the evaluation methodology allows the evaluator to determine both the reduction in number of collisions due to the ACAT and the reduction in collision severity (i.e., closing speed, contact points, relative heading angle) when a collision occurs. Evaluation of the reduction in collision severity can be achieved because the subject vehicle 650 and the GST positions and speeds may be continuously recorded with high precision. Additionally, a more rigorous analysis of the collision severity in a given test can be achieved by determining the predicted collision delta-V (change in velocity) for each test by using a multi-body crash simulation tool.

As will be apparent to persons skilled in the art, modifications and adaptations to the above-described example embodiments of the invention can be made without departing from the spirit and scope of the invention, which is defined only by the following claims.

What is claimed is:

1. A system adapted to test crash avoidance technologies in a subject vehicle, the system comprising:
    a base station comprising a computer in electronic communication with the subject vehicle and with a Guided Soft Target (GST);
    the Guided Soft Target (GST) comprising: a soft body in the form of a collision partner; and removably mounted to a motorized Dynamic Motion Element (DME) and adapted to travel across the ground and into the path of the subject vehicle, the DME having a plurality of wheels, at least one of which is retractable such that the at least one wheel retracts when the subject vehicle drives up onto the DME; the DME comprising an exterior body having:
    a bottom surface held above the ground by a vertical distance GC by a plurality of wheels attached with and extending down from the DME to the ground;
    a top substantially horizontal surface above the bottom surface, the top surface above the ground by a vertical distance H;
    a front upper surface above the bottom surface and below the top surface and at a first angle to the ground;
    a rear upper surface above the bottom surface and below the top surface and at a second angle to the ground;
    a left upper surface above the bottom surface and below the top surface and at a third angle to the ground;
    a right upper surface above the bottom surface and below the top surface and at a fourth angle to the ground;
    the exterior body extending longitudinally by a length L and extending latitudinally by a width W;
    wherein: H is less than 350 millimeters; and the first, second, third and fourth angles to the ground are no more than 45 degrees;
    wherein the DME is adapted to travel across the ground and into the path of the subject vehicle.

2. The system of claim 1, wherein:
    the first angle to the ground is no more than 15 degrees;
    the second angle to the ground is no more than 15 degrees;
    the third angle to the ground is no more than 30 degrees;
    and the fourth angle to the ground is no more than 30 degrees.

3. A method of testing crash avoidance technologies in a subject vehicle, the method comprising the steps of:
    providing a system adapted to test crash avoidance technologies in a subject vehicle, the system comprising:
        a base station comprising a computer in electronic communication with the subject vehicle and with a Guided Soft Target (GST);
        the Guided Soft Target (GST) comprising: a soft body in the form of a collision partner removably mounted to a motorized Dynamic Motion Element (DME) and adapted to travel across the ground and into the path of the subject vehicle; the DME having a plurality of wheels, at least one of which is retractable; the DME comprising an exterior body having:
        a bottom surface held above the ground by a vertical distance GC by a plurality of wheels attached with and extending down from the DME to the ground;
        a top substantially horizontal surface above the bottom surface, the top surface above the ground by a vertical distance H;
        a front upper surface above the bottom surface and below the top surface and at a first angle to the ground;
        a rear upper surface above the bottom surface and below the top surface and at a second angle to the ground;
        a left upper surface above the bottom surface and below the top surface and at a third angle to the ground;
        a right upper surface above the bottom surface and below the top surface and at a fourth angle to the ground;
        the exterior body extending longitudinally by a length L and extending latitudinally by a width W;
        wherein: H is less than 350 millimeters; and the first, second, third and fourth angles to the ground are no more than 45 degrees;
        wherein the DME is adapted to travel across the ground and into the path of the subject vehicle;
    causing the subject vehicle to travel in a first path;
    causing the GST to travel in a second path that intersects the first path;
    causing the subject vehicle to: collide with the GST; impact the soft body of the GST and at least partially remove it from the DME; and drive up onto at least one of the front, rear, left, or right upper surfaces of the DME; and
    causing the at least one wheel to retract when the subject vehicle drives up onto the DME.

4. The method of claim 3, wherein:
    the first angle to the ground is no more than 15 degrees;
    the second angle to the ground is no more than 15 degrees;
    the third angle to the ground is no more than 30 degrees; and
    the fourth angle to the ground is no more than 30 degrees.

5. The system of claim 1, wherein: GC is no more than 50 millimeters.

6. The system of claim 1, wherein: H is no more than 130 millimeters.

7. The system of claim 1, wherein: the first angle to the ground is no more than 30 degrees.

8. The system of claim 1, wherein: the first angle to the ground is no more than 15 degrees.

9. The system of claim 1, wherein: the second angle to the ground is no more than 30 degrees.

10. The system of claim 1, wherein: the second angle to the ground is no more than 15 degrees.

11. The system of claim 1, wherein: the third angle to the ground is no more than 30 degrees.

12. The system of claim 1, wherein: the third angle to the ground is no more than 15 degrees.

13. The system of claim 1, wherein: the fourth angle to the ground is no more than 30 degrees.

14. The system of claim 1, wherein: the fourth angle to the ground is no more than 15 degrees.

15. The system of claim 1, wherein: L is no less than 900 millimeters and no more than 4500 millimeters.

16. The system of claim 1, wherein: L is no less than 2300 millimeters and no more than 2900 millimeters.

17. The system of claim 1, wherein: W is no less than 900 millimeters and no more than 3100 millimeters.

18. The system of claim 1, wherein: W is no less than 1500 millimeters and no more than 2100 millimeters.

* * * * *